(No Model.)

J. E. ANGER.
Horse Detaching Device.

No. 242,852. Patented June 14, 1881.

WITNESSES:
Francis McArdle
C. Sedgwick

INVENTOR:
J. E. Anger
BY Munn & Co
ATTORNEYS.

UNITED STATES PATENT OFFICE.

JOHN E. ANGER, OF ALBANY, ASSIGNOR TO GEORGE H. ANGER, OF GREEN ISLAND, NEW YORK.

HORSE-DETACHING DEVICE.

SPECIFICATION forming part of Letters Patent No. 242,852, dated June 14, 1881.

Application filed November 22, 1880. (No model.)

*To all whom it may concern:*

Be it known that I, JOHN E. ANGER, of Albany, in the county of Albany and State of New York, have invented a new and useful Improvement in Thills, of which the following is a specification.

The object of my invention is to provide certain new and useful improvements in thills which are so constructed that the horse can be released from the vehicle at will, thereby permitting the thills to drop and the wagon to run forward until it meets with sufficient obstructions to check its progress, the thills being prevented from plowing into the ground by cushions attached to the forward ends of the same, which cushions throw the ends of the thills upward as soon as they strike an obstruction, thereby avoiding the dangers and accidents caused by runaway horses.

Figure 1:
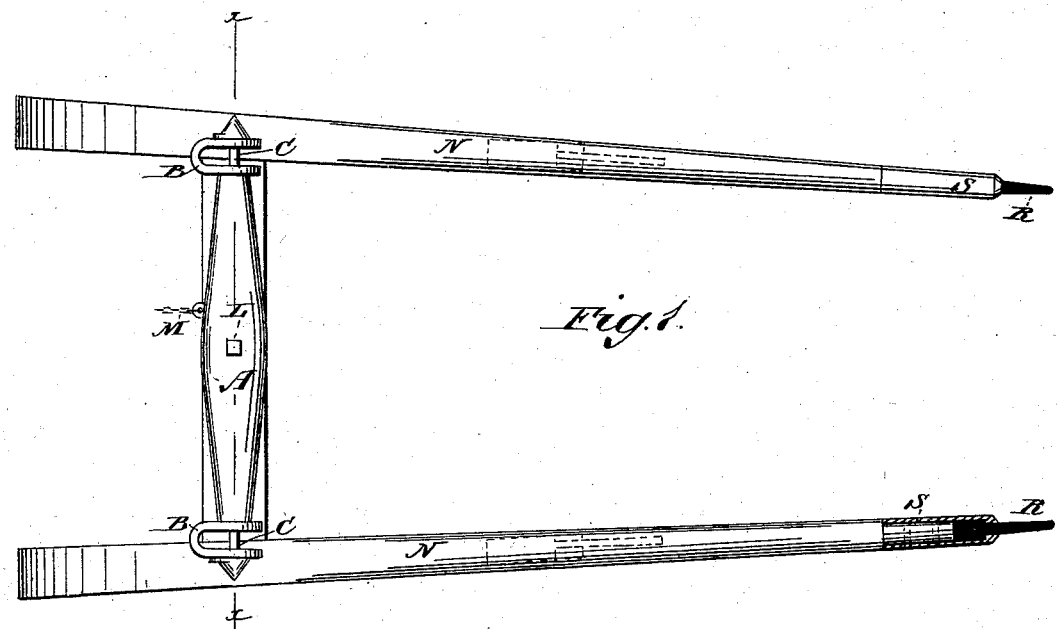
Figure 2:
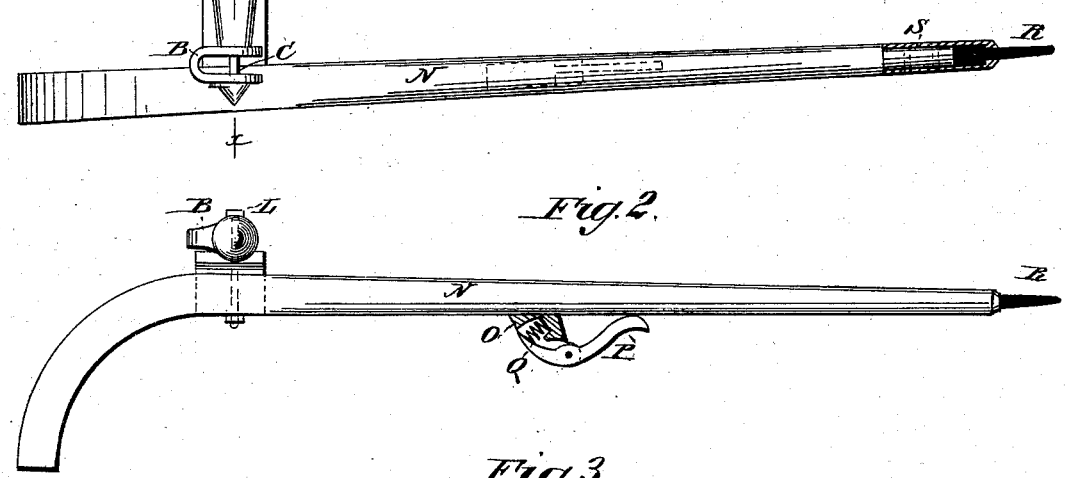
Figure 3:
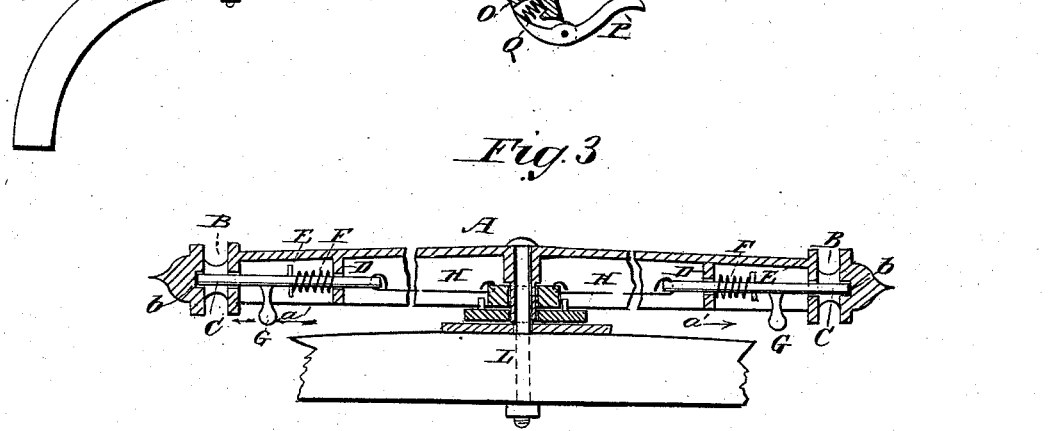
Figure 4:
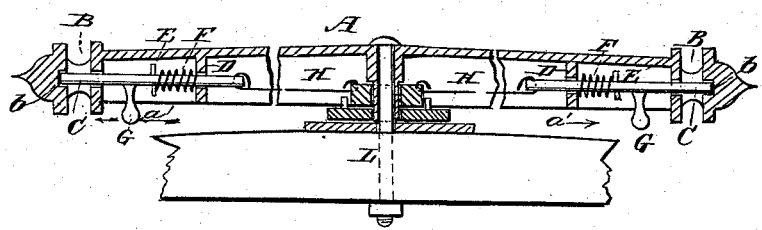

In the accompanying drawings, Figure 1 is a plan view of my improved thills, showing one of the ends in horizontal section. Fig. 2 is a side elevation of the same. Fig. 3 is a longitudinal sectional elevation of the whiffletree of my improved thills on the line $x\,x$, Fig. 1. Fig. 4 is a horizontal sectional view of the center of the same.

Similar letters of reference indicate corresponding parts.

The whiffletree A is provided with a hook, B, the opening of which is toward the top, bottom, or front, at each end, and a sliding pin or bolt, C, passes transversely across the opening of each hook, and serves to hold the traces, the rear ends of which are passed into the openings of these hooks. The bolts C pass through transverse partitions D D near the ends of the whiffletree, and are provided with a shoulder or stud, E, between which and the partition D a spiral spring, F, is held, this spring F forcing the bolts outward in the direction of the arrow $a'$. The outer shank of the hook B may be provided with a recess, $b$, to receive the outer ends of the bolts C, to insure greater strength and safety. The bolts are also provided with knobs or handles G G, for drawing back the bolts while hitching or unhitching the horse. A wire, H, is attached to the inner end of each bolt, and the other ends of these wires are attached to an angular lever or a disk, I, with an arm, K, pivoted at or near the center of the whiffletree by the main bolt L, that pivots the whiffletree to the rear cross-bar of the thill. A chain, cord, or wire, M, is attached to the outer end of the arm K and passes to the driver's seat. The whiffletree can be made hollow, of metal, or may be made of wood, with the wires H H on the outside. The backing-straps are wound around the thills N N, and around the projections O O on the upper or lower sides of these thills. A bent arm, P, is pivoted to the end of each projection O, and a spiral spring, Q, acts upon the inner ends of these arms, which must open toward the front of the thills, so that the backing-straps can be drawn off the thills when the horse is released, the springs Q giving way sufficiently to let the straps pass. Rubber points or cushions R R are attached to the front ends of the thills, and are preferably held by means of a casing, S, surrounding the inner ends of the cushions R and the outer ends of the thill.

The operation is as follows: To hitch the horse to the vehicle the bolts C C are drawn inward by means of the knobs G G, the edges of the traces are passed into the hooks B B, and the bolts are released and forced through the opening in the traces, thereby holding the latter to the whiffletree. If the horse runs away, the driver pulls the chain M, thereby rotating the disk I in the direction of the arrow $d'$ and drawing the bolts inward, thus releasing the horse, which draws the backing-straps off of the thills, which drop to the ground. The cushions R R throw the thills upward whenever they strike an obstruction, thereby preventing the ends of the thills from plowing into the ground and overturning the vehicle.

Having thus fully described my invention, I claim as new and desire to secure by Letters Patent—

1. The disk I, pivoted in the middle of a whiffletree, and having arm K and wire rods H, in combination with the bolts C, provided with studs E, spiral springs F, and handles G, substantially as and for the purpose described.

2. The combination, with the thills N, of the projections O and a bent arm, P, the latter pivoted to the end of each projection, as shown and described.

JOHN EDWARD ANGER.

Witnesses:
 FREDERICK JOHN MORRIS,
 JUDSON HOIT.